US009991723B2

(12) United States Patent
Gao et al.

(10) Patent No.: US 9,991,723 B2
(45) Date of Patent: Jun. 5, 2018

(54) VIRTUAL CELL METHOD FOR BATTERY MANAGEMENT

(71) Applicant: THE BOEING COMPANY, Chicago, IL (US)

(72) Inventors: Lijun Gao, Kent, WA (US); Shengyi Liu, Sammamish, WA (US); George M. Roe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 534 days.

(21) Appl. No.: 13/621,769

(22) Filed: Sep. 17, 2012

(65) Prior Publication Data
US 2014/0077765 A1   Mar. 20, 2014

(51) Int. Cl.
*H02J 7/00* (2006.01)

(52) U.S. Cl.
CPC .............. *H02J 7/00* (2013.01); *H02J 7/0016* (2013.01)

(58) Field of Classification Search
CPC ...... H02J 7/0014–7/0019; H02J 7/0021; H02J 7/0026; G01R 31/3679; B60L 11/1866
See application file for complete search history.

(56) References Cited

U.S. PATENT DOCUMENTS

| 6,014,013 | A | 1/2000 | Suppanz et al. |
| 6,873,134 | B2 | 3/2005 | Canter et al. |
| 7,554,294 | B2 | 6/2009 | Srinivasan et al. |
| 2003/0210016 | A1* | 11/2003 | Thorne et al. ................. 320/116 |
| 2008/0185994 | A1 | 8/2008 | Altemose |
| 2009/0072791 | A1* | 3/2009 | Morita .................. H02J 7/0018 320/134 |
| 2009/0167247 | A1* | 7/2009 | Bai et al. ....................... 320/134 |
| 2010/0164430 | A1* | 7/2010 | Lu et al. ....................... 320/103 |

FOREIGN PATENT DOCUMENTS

| CN | 101471577 | 7/2009 |
| CN | 102055358 | 5/2011 |
| JP | 2003-102132 | 4/2003 |
| JP | 2012-157217 | 8/2012 |
| WO | 2007/128876 A1 | 11/2007 |
| WO | WO 2007128876 A1 * | 11/2007 ............ H01M 10/42 |
| WO | WO2011/118039 | 9/2011 |
| WO | WO2012/042401 | 4/2012 |

OTHER PUBLICATIONS

Daowd et al., "Passive and Active Battery Balancing Comparison based on MATLAB Simulation", IEEE, 2011.
Xie, et al., "State of Health Aware Charge Management in Hybrid Electrical Energy Storage System", EDAA (2012).
International Search Report, PCT/US2013/047331, dated Mar. 19, 2014.
Communication pursuant to Article 94(3) EPC dated Feb. 10, 2017 in European Patent Application No. 13 734 609.4-1804 (7pages).
Communication pursuant to Article 94(3) EPC in European Patent Application No. 13 734 609.4-1804 (7pages).

* cited by examiner

*Primary Examiner* — Vuthe Siek
*Assistant Examiner* — Aric Lin
(74) *Attorney, Agent, or Firm* — Haynes and Boone, LLP

(57) ABSTRACT

The present disclosure provides a system, method, and apparatus for battery management. The disclosed method involves current balancing through sinking and/or sourcing current, by at least one virtual cell, for battery cells in a battery pack based on available current and capacity of the battery cells. In one or more embodiments, at least one virtual cell is capable to sink and/or source current for at least one degraded battery cell or at least one dead battery cell.

24 Claims, 9 Drawing Sheets

VIRTUAL CELL METHOD FOR BATTERY MANAGEMENT

BACKGROUND

The present disclosure relates to battery management. In particular, it relates to a virtual cell method for battery management.

Currently, a typical conventional battery pack comprises an array of battery cells connected together in parallel and in series. Ideally, these battery cells have the same internal (i.e. various over-potentials of the electrodes and separator) and external (i.e. voltage and discharge capacity) characteristics. However, this is practically not true due to battery cell defect variations as well as to different levels of degradations to the battery cells resulting from processes of manufacturing, storage, transportation, and operation. A defective or degraded battery cell has a higher over-potential (i.e. externally exhibiting as a higher internal resistance) compared to other battery cells to which the battery cell is connected in parallel. The defective or degraded battery cell tends to generate more heat, thereby causing overheating to itself and to its neighboring battery cells. This excess of heat may result in an accelerated degradation of the batteries.

SUMMARY

The present disclosure relates to a method, system, and apparatus for a virtual cell method for battery management. In at least one embodiment, a method for battery management is disclosed. The method involves current balancing through sinking and/or sourcing current, by at least one virtual cell, for battery cells in a battery pack based on available capability (e.g., current (Amperes) and/or capacity (Ampere hours)) of the battery cells. In one or more embodiments, at least one virtual cell is capable to sink and/or source current for at least one degraded battery cell or at least one dead battery cell.

In one or more embodiments, the present disclosure teaches a method for battery management for current balancing battery cells based on the capability of the battery cells. The disclosed method involves receiving, by a virtual cell management controller, a voltage and a current of at least one battery layer. In one or more embodiments, at least one battery layer comprises at least one of the battery cells. The method further involves receiving, by the virtual cell management controller, a voltage and a current of a battery pack. In at least one embodiment, the battery pack comprises all of the battery cells. In addition, the method involves determining, by the virtual cell management controller, whether the battery pack is charging, discharging, or idle, by analyzing the current of the battery pack. Also, the method involves determining, by the virtual cell management controller, a reference voltage when the virtual cell management controller determines that the battery pack is charging or discharging. Additionally, the method involves providing, by at least one voltage controller, a battery pack voltage to the battery pack. Further, the method involves providing, by at least one voltage controller, a respective battery layer voltage to its associated battery layer. In at least one embodiment, the respective battery layer voltage is dependent upon the reference voltage and the voltage of at least one battery layer.

In one or more embodiments, the virtual cell management controller is integrated within at least one voltage controller. In some embodiments, when there is more than one battery cell within at least one battery layer, the battery cells are connected together in parallel within the battery layer(s). In at least one embodiment, when there is more than one battery layer, the battery layers are connected together in series. In one or more embodiments, the method further involves logging, by a system controller, the reference voltage, the voltage of the battery pack, the current of the battery pack, the voltage of at least one battery layer, and/or the current of at least one battery layer.

In at least one embodiment, at least one voltage controller comprises a proportional integral derivative (PID) controller, a pulse width modulation (PWM) controller, a gate drive, and/or a power stage. In one or more embodiments, the power stage is a direct current/direct current (DC/DC) converter. In some embodiments, the DC/DC converter is an isolated bi-directional full-bridge converter or an isolated bi-directional half-bridge converter. In one or more embodiments, at least one of the battery cells is connected to a fuse.

In one or more embodiments, the virtual cell management controller determines the reference voltage by using a maximum voltage of the battery layer(s) and a minimum voltage of the battery layer(s). In some embodiments, when the battery pack is discharging, the virtual cell management controller determines the reference voltage by further using the minimum current of the battery layer(s). In at least one embodiment, when the battery pack is charging, the virtual cell management controller determines the reference voltage by further using the maximum current of the battery layer(s).

In at least one embodiment, a system for battery management for current balancing battery cells based on the capability of the battery cells is disclosed. The disclosed system comprises at least one battery layer. In one or more embodiments, at least one battery layer comprises at least one of the battery cells. The system further comprises a battery pack. In some embodiments, the battery pack comprises all of the battery cells. Also, the system comprises a virtual cell management controller to receive a voltage and a current of at least one battery layer; to receive a voltage and a current of the battery pack; to determine whether the battery pack is charging, discharging, or idle by analyzing the current of the battery pack; and to determine a reference voltage when the virtual cell management controller determines that the battery pack is charging or discharging. Further, the system comprises at least one voltage controller to provide a battery pack voltage to the battery pack; and to provide a respective battery layer voltage to the battery layer associated with the voltage controller(s), where the respective battery layer voltage is dependent upon the reference voltage and the voltage of at least one battery layer.

In one or more embodiments, the system further comprises a system controller to log the reference voltage, the voltage of the battery pack, the current of the battery pack, the voltage of at least one battery layer, and/or the current of at least one battery layer.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

Figure 1:
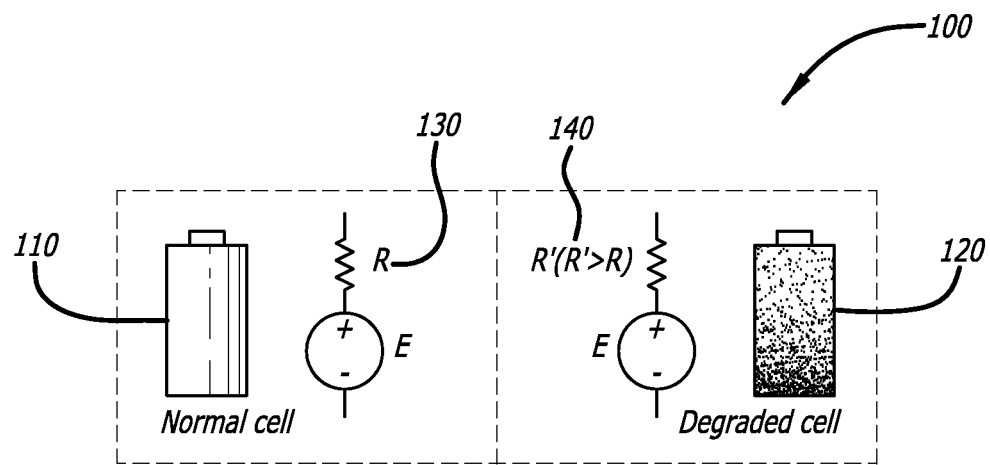
FIG. 1 is a schematic diagram showing the difference in internal resistances between a normal battery cell and a degraded battery cell, in accordance with at least one embodiment of the present disclosure.

The methods and apparatus disclosed herein provide an operative system for a virtual cell method for battery management. Specifically, this system employs, for the virtual battery cells, voltage controllers for each battery layer and a voltage cell management (VCM) controller.

The present disclosure teaches an intelligent battery management system based on a virtual cell method to perform 1) real-time detection of battery cell degradation and fault status, 2) battery cell health and fault management, and 3) battery cell life management. The system integration architecture allows for the disclosed system to incorporate any charge/discharge protocols that fit the specific battery chemistry. The virtual cell provides a means to sense and determine the state of charge and the state of health of the battery cells. The virtual cell also provides a means to actively manage the battery system by sharing the current load and by distributing the load amongst the battery cells according to their health conditions, thereby protecting the healthy battery cells from overloading and protecting the degraded battery cells from an accelerated degradation process. The system of the present disclosure enhances battery pack performance and extends the life of the battery pack. Significant cost savings can be achieved if the disclosed system is used for the batteries of mobile or stationary power systems.

Conventional battery management systems use a voltage balancer (also known as "an equalizer") to force the battery cells to have the same voltage. This method equalizes the battery cell voltage and alleviates the degradation process when the battery cells are equally healthy (or equally unhealthy). However, if one or more of the battery cells are defective, or more degraded than the others, the voltage balancer fails to protect the battery cell(s), because it forces to overload the healthy battery cells with a higher than a normal current, and in the meantime, to deteriorate the degraded battery cells with a significantly higher current load than it is able to carry. The process of battery cell degradation then accelerates under these circumstances. To mitigate the problem of a voltage balancer, conventional methods impose very tight design constraints and use oversized batteries, which brings in cost, weight, and volume issues. The voltage balancers in these existing solutions can be classified into two groups. The first group is passive balancers, which employ passive components, such as resistors, capacitors, and inductors in the balancing network. The disadvantages of passive balancers include, but are not limited to, lack of accuracy, slow response, and low efficiency, if it is a resistive balancer. The second group is active balancers, which employ active components, such as various power electronic converters in the balancing network. The main problem with the existing active balancer is that typically a current limiting resistor is used in the balancer, which contributes to the power consumption and limits the dynamic response. In both of these cases, the balancers do not have a mechanism to share and distribute the current based on the health status of the battery cells health.

The existing solutions, whether they are passive or active, work well when the battery cells are equally healthy or equally degraded, which is a rare situation and perhaps never found in practice. When battery cells are not equally healthy, the existing solutions overload the healthy battery cells with a higher current than they are designed to accommodate, and deteriorate the unhealthy battery cells by using a current higher than that they are able to carry. Therefore, the existing solutions accelerate the degradation process of the battery pack.

The system of the present disclosure is capable of dynamically sharing the current, and distributing the current according to the health conditions of the battery cells. By doing so, the current of a healthy battery cell does not exceed its designated value, and the current of an unhealthy battery cell is controlled within its capability. Therefore, both healthy and unhealthy battery cells are protected. The degradation process of the entire battery pack is deterred, and the battery life is extended. Since the system of the present disclosure is able to protect both the healthy and unhealthy battery cells, the performance of the battery pack, in terms of power level and life cycles, can be fully explored and enhanced. This directly translates into a cost savings because the system can significantly reduce the oversizing margin of the battery cells and improve the safety margin of the conventional design.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 2:
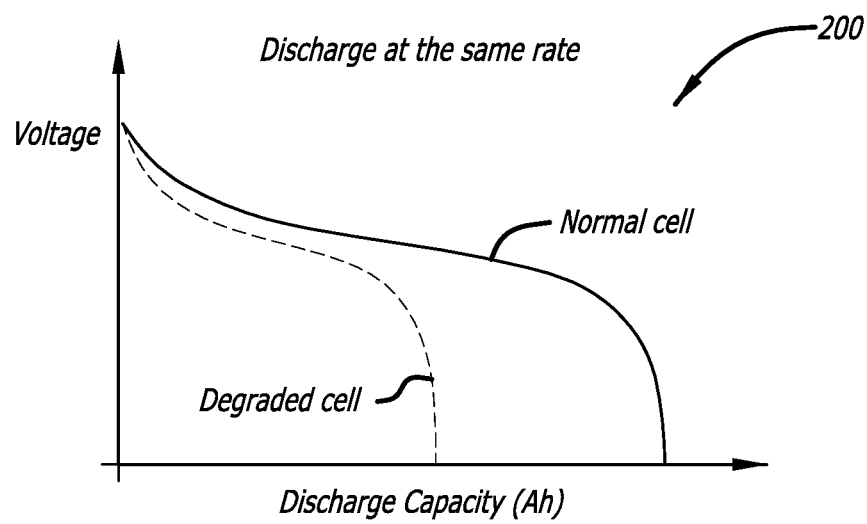
FIG. 2 is a graph illustrating the difference in discharge capacity between a normal battery cell and a degraded battery cell, in accordance with at least one embodiment of the present disclosure.

There are various different degradation and failure modes that battery cells can experience. In particular, there are two main battery cell degradation modes. The first battery cell degradation mode is an internal resistance increase and the second battery cell degradation mode is capacity fade. FIGS. 1 and 2 illustrate these two modes.

FIG. 1 is a schematic diagram 100 showing the difference in internal resistances 130, 140 between a normal battery cell 110 and a degraded battery cell 120, in accordance with at least one embodiment of the present disclosure. In this figure, the normal battery cell 110 is shown to have an internal resistance of R ohms 130, while the degraded battery cell 120 is shown to have an internal resistance of R' ohms 140. R' is greater than R and, as such, the degraded battery cell 120 has a greater internal resistance than the normal battery cell 110. This increase in internal resistance results from an ohmic over-potential increase in electrolyte, electrodes, contacts, etc.

FIG. 2 is a graph 200 illustrating the difference in discharge capacity between a normal battery cell and a degraded battery cell, in accordance with at least one embodiment of the present disclosure. In this figure, the graph 200 depicts the voltage for a normal battery cell and a degraded battery cell over discharge capacity in Ampere hours (Ah). The graph 200 shows that the degraded battery cell has a lower amount of discharge capacity than the normal battery cell. This resultant capacity fade for the degraded battery cell results from a loss of active materials.

It should be noted that there are two main battery cell failure modes. The first battery cell failure mode is that when the battery cell fails, it acts as an internal open circuit. This mode is the more common case, and is inherently safe to the battery pack. The second battery cell failure mode is that when the battery cell fails, it acts as an internal short circuit. This mode can cause catastrophic damage to the battery pack.

Figure 3:
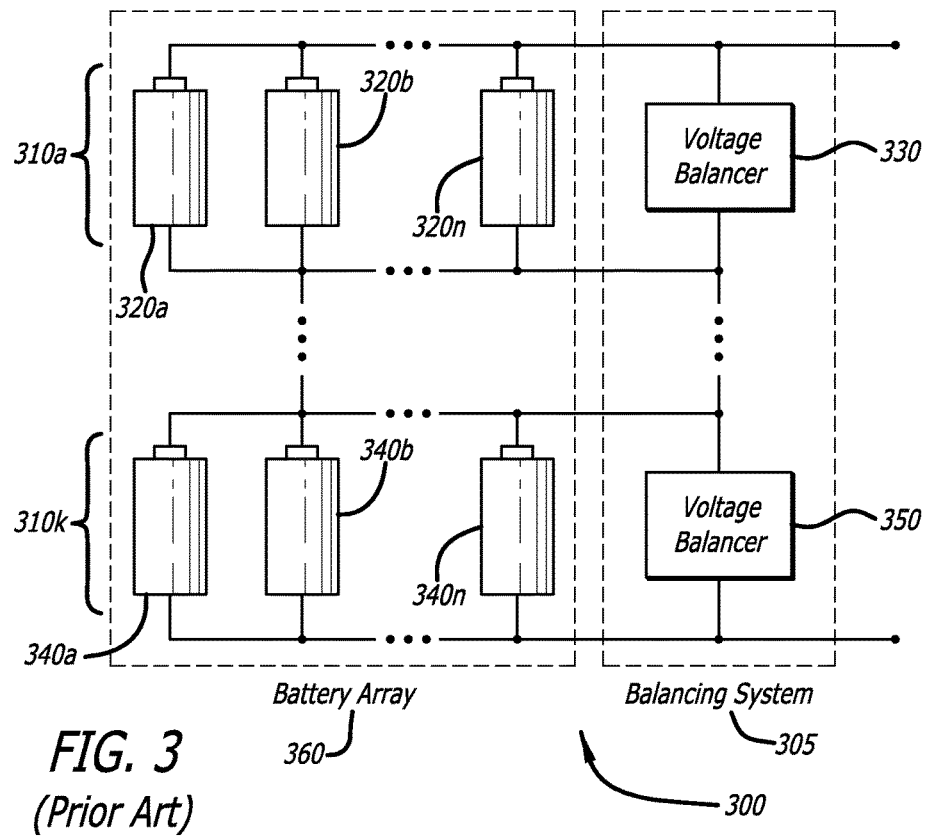
FIG. 3 is schematic diagram of a conventional battery management system employing voltage balancers.

FIG. 3 is schematic diagram of a conventional battery management system 300 employing voltage balancers 330, 350. In this figure, the system 300 contains two main parts, which are the battery array 360 and the balancing system 305. The battery array (also referred to as the battery pack) 360 is shown to comprise a plurality of battery layers 310a-k (e.g., k number of battery layers) that are connected together in series. Within each battery layer 310a-k are a plurality of battery cells 320, 340 (e.g., battery layer 310a comprises battery cells 320a-n, and battery layer 310k comprises battery cells 340a-n). The battery cells 320, 340 are connected together in parallel within their respective battery layer 310a, 310k. The balancing system 305 is shown to comprise voltage balancers 330, 350 that are each connected to their respective battery layer 310a, 310k (e.g., voltage balancer 330 is connected to battery layer 310a and voltage balancer 350 is connected to battery layer 310k).

Figure 4:
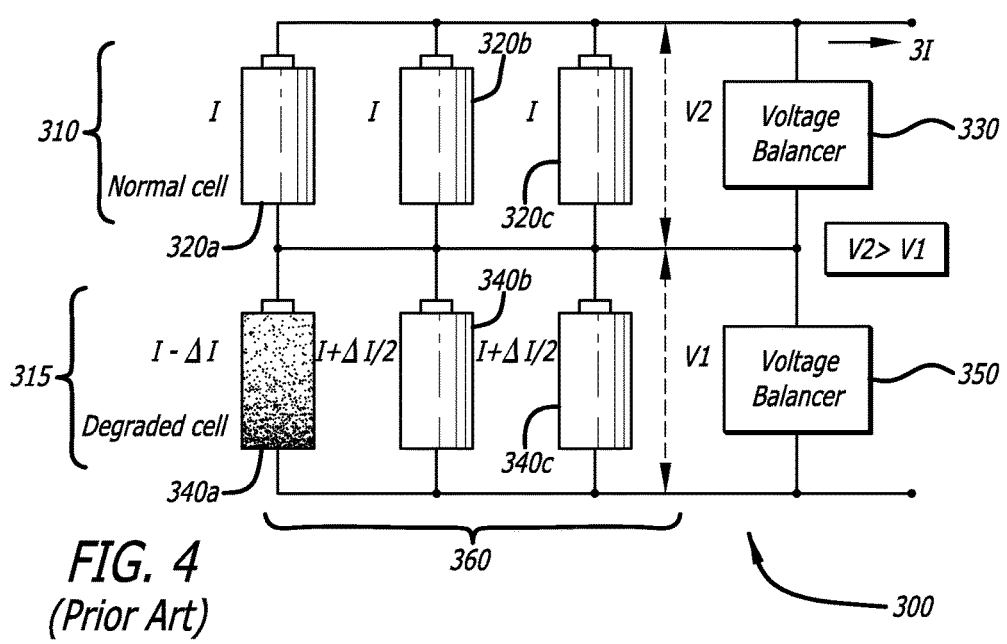
FIG. 4 is a schematic diagram of the conventional battery management system employing voltage balancers of FIG. 3 where there is degraded battery cell during discharging of the battery pack.

FIG. 4 is a schematic diagram of the conventional battery management system 300 employing voltage balancers 330, 350 of FIG. 3 where there is degraded battery cell 340a during discharging of the battery pack 360. In this figure, since the battery pack 360 is shown to be producing a positive current (3I), the battery pack 360 is discharging. The system 300 is shown to comprise two battery layers 310, 315, where each battery layer 310, 315 comprises three battery cells 320, 340.

Also shown in this figure, battery cell 340a is a degraded battery cell, and the remaining battery cells 320a-c, 340b-c are normal battery cells. Normal battery cells have a current of I amperes (amps) if all of the battery cells within their battery layer are healthy. Since battery cell 340a is degraded, it now has a current of I-ΔI amps. The voltage balancer 350 associated with the battery layer 315 containing the degraded battery cell 340a causes the other battery cells 340b, 340c in that battery layer 315 to have an increase in current to compensate for the loss of current in the degraded battery cell 340a. As such, the voltage balancer 350 causes battery cells 340b, 340c to each have a current of I+ΔI/2 amps.

Figure 5:
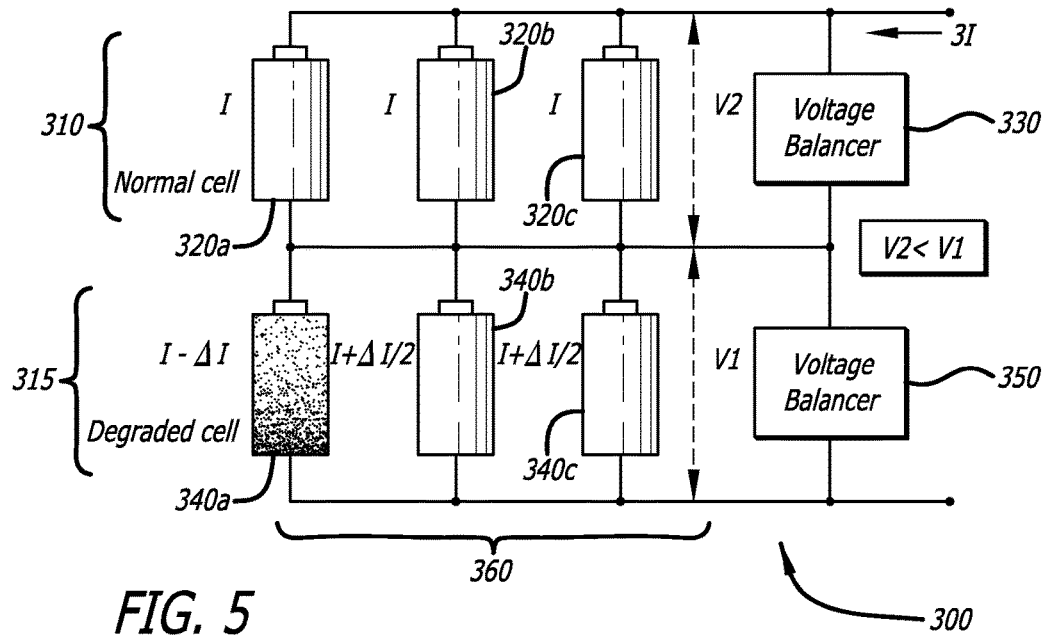
FIG. 5 is a schematic diagram of the conventional battery management system employing voltage balancers of FIG. 3 where there is degraded battery cell during charging of the battery pack.

FIG. 5 is a schematic diagram of the conventional battery management system 300 employing voltage balancers 330, 350 of FIG. 3 where there is degraded battery cell 340a during charging of the battery pack 360. In this figure, since the battery pack 360 is shown to be receiving a positive current (3I), the battery pack 360 is charging. The voltage balancer 350 is shown to operate similarly for the case depicted in FIG. 4 where the battery pack 360 is discharging.

It should be noted that for this 2×3 battery array example shown in FIGS. 4 and 5, a conventional voltage balancer is assumed to be employed for the voltage balancers 330, 350. Battery cell 340a is degraded and, thus, has a resistance of R+ΔR, where ΔR is the resistance increase, and R is the resistance possessed by each of all the normal battery cells 320a-c, 340b-c. Because the voltage balancers 330, 350 cannot share current, this causes the voltages to be temporarily unbalanced. As such, the voltage of battery layer 310 is greater than the voltage of battery layer 315 (V2>V1) when the battery pack 360 is discharging; and the voltage of battery layer 310 is less than the voltage of battery layer 315 (V2<V1) when the battery pack 360 is charging. As can be seen from these figures, each of the normal cells 340b,c in the lower battery layer 315 is overloaded by ΔI/2 amps, where I amps is the battery cell current if all of the battery cells in a battery layer are normal. For a battery layer of n number of battery cells connected together in parallel, it can be shown that $$\Delta I = \frac{(n-1)\Delta R/R}{1+(n-1)(1+\Delta R/R)}I \qquad \text{Equation (1)}$$

Therefore, each battery cell, connected in parallel with the degraded battery cell, will be overloaded by $$\frac{\Delta I}{(n-1)} = \frac{\Delta R/R}{1+(n-1)(1+\Delta R/R)}I \qquad \text{Equation (2)}$$

This current overloading will cause the battery cells to degrade at an accelerated pace.

Figure 6:
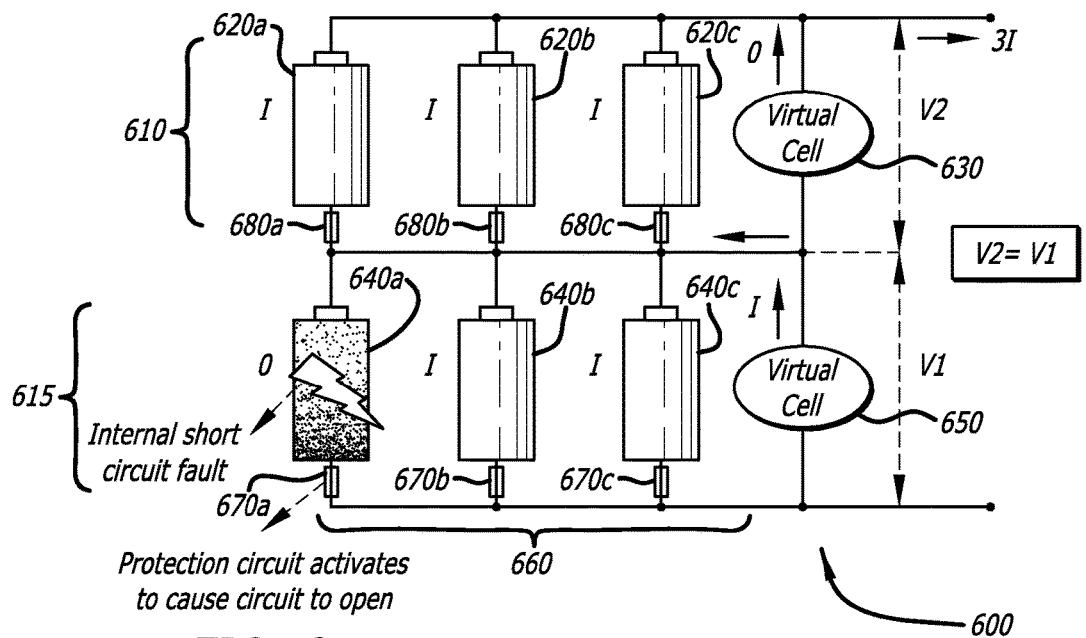
FIG. 6 is a schematic diagram of the disclosed battery management system that in effect employs a virtual battery cell for each battery layer, in accordance with at least one embodiment of the present disclosure.

FIG. 6 is a schematic diagram of the disclosed battery management system 600 that in effect employs a virtual battery cell 630, 650 for each battery layer 610, 615, in accordance with at least one embodiment of the present disclosure. This figure illustrates how under the condition of a battery cell short circuit failure mode, the virtual cell 650 protects the normal battery cells 620a-c, 640b-c from catastrophic failure.

In this figure, the system 600 is shown to comprise two battery layers 610, 615, where each battery layer 610, 615 comprises three battery cells 620, 640 (i.e. battery layer 610 comprises battery cells 620a-c, and battery layer 615 comprises battery cells 640a-c). The battery cells 620, 640 are shown to be connected together in parallel within their respective battery layer 610, 615. Each of the battery cells 620, 640 is connected to a respective protection circuit (e.g., a fuse) 680, 670. The battery layers 610, 615 are shown to be connected together in series. Two virtual cells 630, 650 are each connected to their respective battery layer 610, 615. It should be noted that for other embodiments of the disclosed system, more or less than two battery layers 610, 615 may be employed; more or less than three battery cells 620, 640 for each battery layer 610, 615 may be employed; the battery layers 610, 615 may have a different number of battery cells 620, 640 than one another; more or less than two virtual cells 630, 650 may be employed; protection circuits 680, 670 may or may not be employed; and/or not all of the battery cells 620, 640 may be connected to a protection circuit 680, 670.

The typical battery cell failure mode is open-circuited. If a short-circuit fault occurs, a protection circuit (e.g., a fuse) activates to disconnect the battery cell, thereby causing it to be open-circuited. In both cases, the dead battery cell cannot provide any current. In this figure, battery cell 640a is experiencing an internal short circuit failure, which can cause catastrophic damage to the battery pack 660. The protection circuit 670a, which is connected to battery cell 640a, is activated to disconnect the battery cell 640a, thereby causing it to be open-circuited. The virtual cell 650 in this case functions to provide a full battery cell current I. FIG. 6 shows that all of the battery cell currents and voltages are balanced (i.e. V2=V1) and, thus, the battery cells 620a-c, 640b-c are protected from catastrophic failure and from accelerated degradation.

Figure 7:
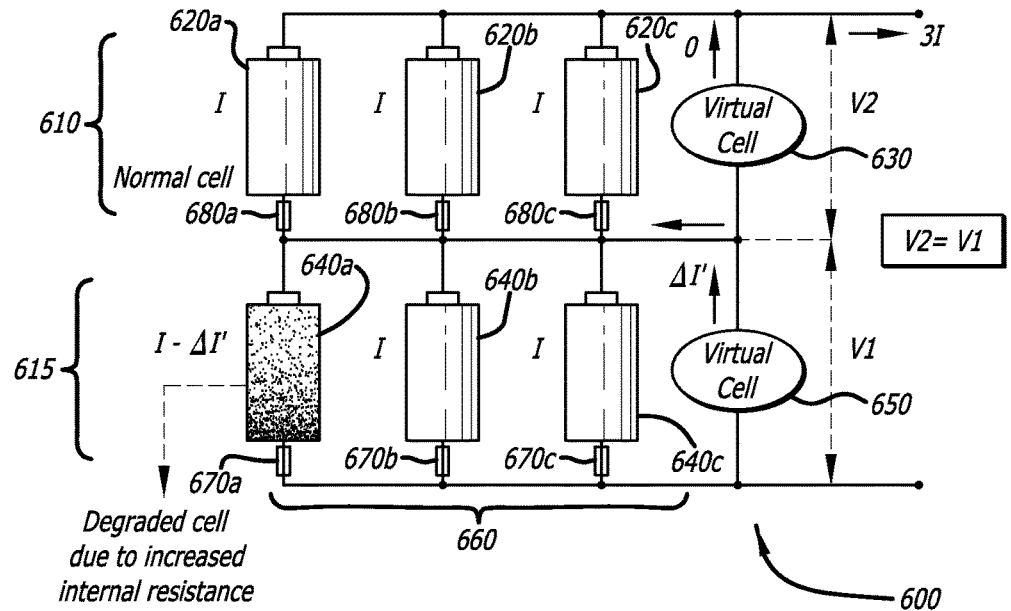
FIG. 7 is a schematic diagram of the disclosed battery management system of FIG. 6 illustrating how a virtual battery cell provides current to protect the healthy battery cells and the degraded battery cell, in accordance with at least one embodiment of the present disclosure.

FIG. 7 is a schematic diagram of the disclosed battery management system 600 of FIG. 6 illustrating how a virtual battery cell 650 provides current to protect the healthy battery cells 620a-c, 640b-c and the degraded battery cell 640a, in accordance with at least one embodiment of the present disclosure. This figure illustrates how under the condition of a degraded battery cell (internal resistance increase) 640a, a virtual cell 650 provides a current and protects the normal battery cells 620a-c, 640b-c from accelerated degradation.

If a degraded battery cell 640a exists, the virtual cell 650 complements the current deficit resulting from the degraded battery cell 640a and protects the healthy battery cells 620a-c, 640b-c from an accelerated degradation. In this figure, battery cell 640a is a degraded battery cell and now has a current of I-ΔI' amps. Virtual cell 650 complements the current deficit (ΔI') resulting from the degraded battery cell 640a. As shown in this figure, all of the normal battery cells 620a-c, 640b-c are balanced in both current and voltage. If n number of battery cells are connected together in parallel, it can be shown that the current provided by the virtual cell is $$\Delta I' = \frac{\Delta R/R}{1 + \Delta R/R} I \qquad \text{Equation (3)}$$

Comparing Equation (3) to Equation (1) which applies to the case of a conventional balancer, since $$\frac{\Delta I'}{\Delta I} = 1 + \frac{1}{(n-1)(1 + \Delta R/R)} > 1 \qquad \text{Equation (4)}$$

We have:

$$\Delta I' > \Delta I \qquad \text{Equation (5)}$$

Equation (5) explains that the virtual cell causes the degraded cell to have a less current load and, therefore, the degradation process is deterred.

Overall, the virtual cell 650 is capable of balancing the voltage instantly. This results in a balanced current among all of the normal cells 620a-c, 640b-c, and a decreased current for the degraded cell 640a, therefore protecting the normal battery cells 620a-c, 640b-c from overload, and protecting the degraded cell 640a from an accelerated degradation.

Figure 8:
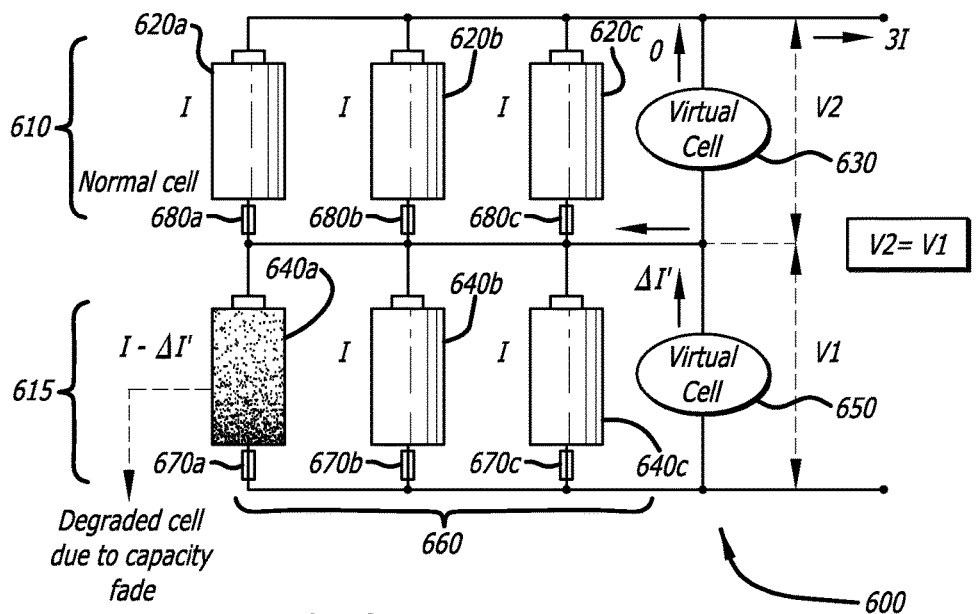
FIG. 8 is a schematic diagram of the disclosed battery management system of FIG. 6 illustrating how a virtual battery cell provides current to protect the healthy battery cells and the degraded battery cell due to a capacity fade, in accordance with at least one embodiment of the present disclosure.

FIG. 8 is a schematic diagram of the disclosed battery management system 600 of FIG. 6 illustrating how a virtual battery cell 650 provides current to protect the healthy battery cells 620a-c, 640b-c and the degraded battery cell 640a due to a capacity fade, in accordance with at least one embodiment of the present disclosure. This figure illustrates how under the condition of a degraded battery cell (due to a capacity fade) 640a, a virtual cell 650 provides a current to compensate for the deficit, thereby protecting the normal cells 620a-c, 640b-c from overload and protecting the degraded cell 640a from accelerated degradation.

When a battery cell 640a is degraded in capacity, the ability of it to provide current is decreased compared to a normal battery cell 620a-c, 640b-c under the same external condition. Because a virtual cell 650 can instantly balance the voltage, the current deficit due to the degraded battery cell 640a is compensated by the virtual cell 650, and the currents of all of the normal battery cells 620a-c, 640b-c are balanced, thereby protecting the normal battery cells 620a-c, 640b-c from an overload. In this figure, battery cell 640a is a degraded battery cell due to a capacity fade and, as such, now has a current of I-ΔI' amps. Virtual cell 650 complements the current deficit (ΔI') resulting from the degraded battery cell 640a. Similar to the case of the degraded cell due to internal resistance increase, the current decrease in this case is larger than the current decrease in the case of a conventional voltage balancer. Therefore, the degradation process of the degraded cell 340a is deterred.

Notice that the virtual cell method to compensate the current deficit of a capacity-degraded battery cell is independent of how much the current decreases as a function of capacity fade. The ability of a battery cell to provide current decreases as the capacity fades. It should be noted that the virtual cell simply supplies a current to compensate for whatever the current deficit is under the condition of a balanced voltage for the battery pack 660.

Figure 9:
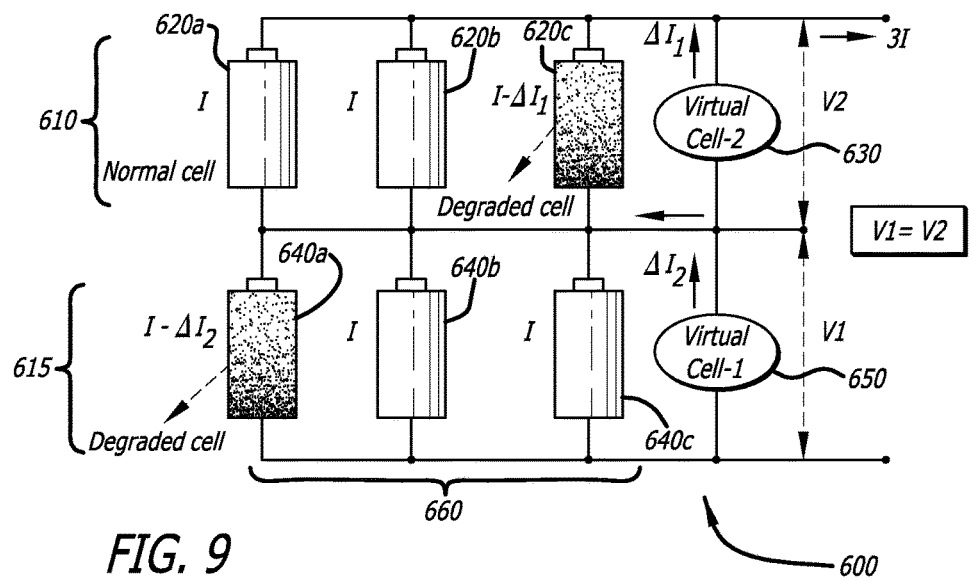
FIG. 9 is a schematic diagram of the disclosed battery management system of FIG. 6 illustrating how two virtual battery cells provide currents to compensate for two degraded battery cells, in accordance with at least one embodiment of the present disclosure.

FIG. 9 is a schematic diagram of the disclosed battery management system 600 of FIG. 6 illustrating how two virtual battery cells 630, 650 provide currents to compensate for two degraded battery cells 620c, 640a, in accordance with at least one embodiment of the present disclosure. And, FIG. 10 is a schematic diagram of the disclosed battery management system 600 of FIG. 6 illustrating how two virtual battery cells 630, 650 provide currents to compensate for three degraded battery cells 620c, 640a, 640b, in accordance with at least one embodiment of the present disclosure.

Figure 10:
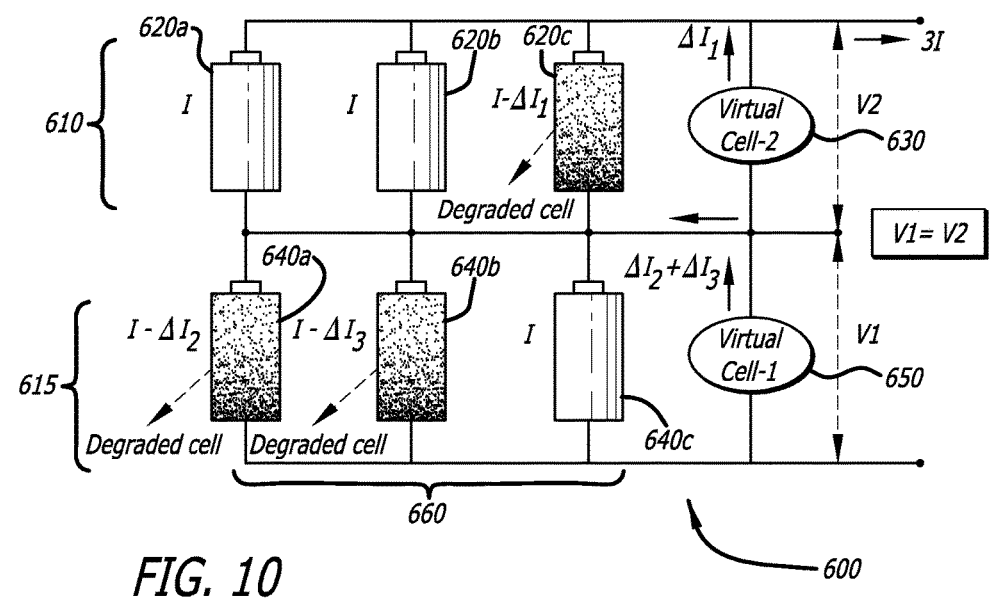
FIG. 10 is a schematic diagram of the disclosed battery management system of FIG. 6 illustrating how two virtual battery cells provide currents to compensate for three degraded battery cells, in accordance with at least one embodiment of the present disclosure.

In the case of more than one degraded battery cell (as illustrated in FIG. 9) and in the case of where the degraded battery cells are located in different battery layers of the battery pack 660 (as illustrated in FIG. 10), the virtual cell system 600 is capable of performing voltage and current balancing simultaneously and instantaneously for every battery layer 610, 615 and for every normal battery cell (620a-b, 640b-c for FIGS. 9 and 620a-b, 640c for FIG. 10). The current deficits resulted from the degraded battery cells (620c, 640a for FIGS. 9 and 620c, 640a-b for FIG. 10), either from resistance increase or capacity fade, or both, are compensated automatically by the virtual cells 630, 650. As such, all of the normal battery cells (620a-b, 640b-c for FIGS. 9 and 620a-b, 640c for FIG. 10) are protected from overload, and all of the degraded battery cells (620c, 640a for FIGS. 9 and 620c, 640a-b for FIG. 10) are protected from an accelerated degradation.

Figure 11:
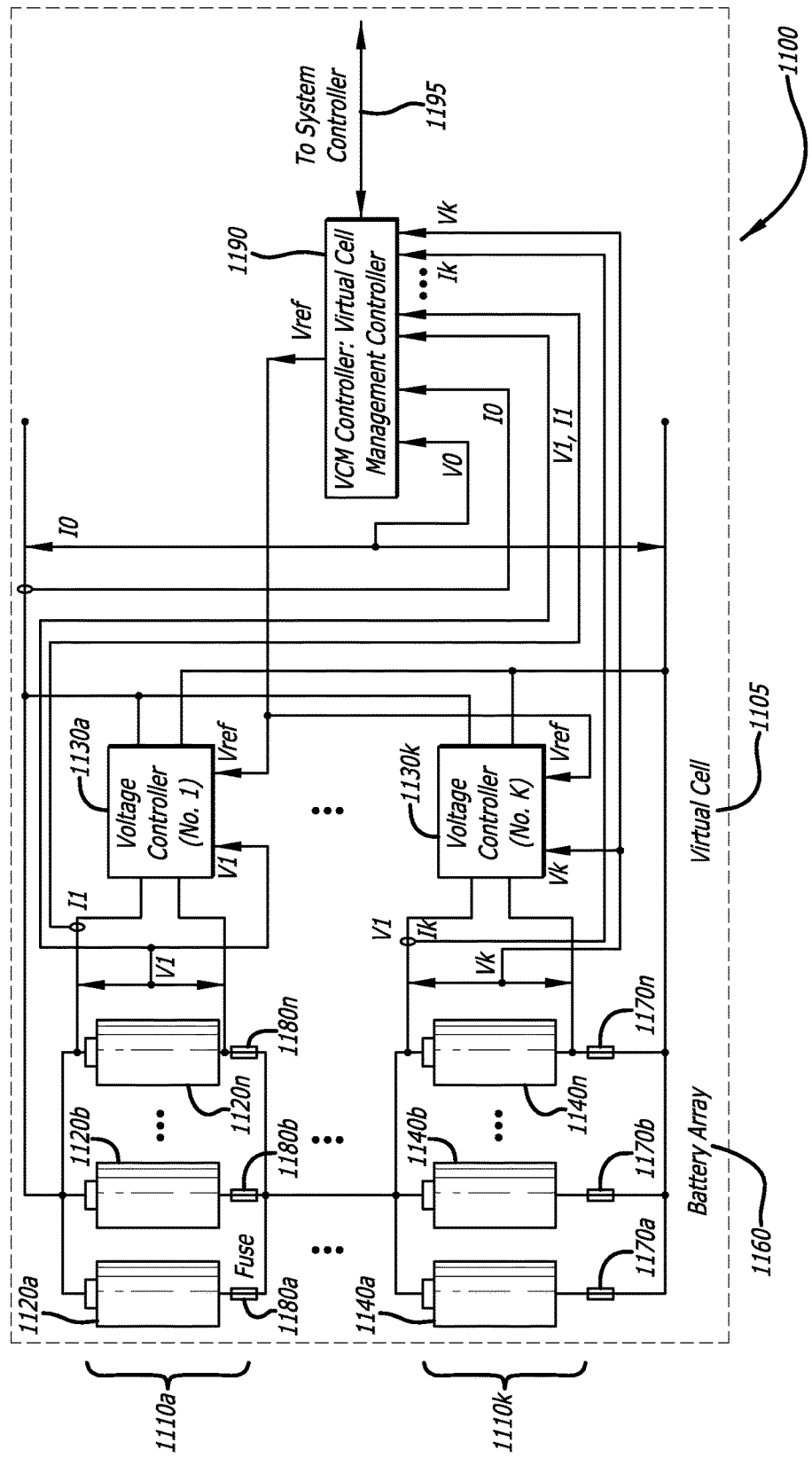
FIG. 11 is a schematic diagram of the disclosed battery management system employing voltage controllers for each battery layer and a voltage cell management (VCM) controller for the virtual cell, in accordance with at least one embodiment of the present disclosure.

FIG. 11 is a schematic diagram of the disclosed battery management system 1100 employing voltage controllers 1130a-k for each battery layer 1110a-k and a voltage cell management (VCM) controller 1190 for the virtual cell 1105, in accordance with at least one embodiment of the present disclosure. In this implementation, the virtual cell system 1100 has k number of voltage controllers 1130a-k, corresponding to k number of series-connected battery layers 1110a-k of the battery array (or the battery pack) 1160. Each voltage controller 1130a-k is connected to its associated battery layer 1110a-k. Each battery layer 1110a-k comprises n number of battery cells 1120a-n, 1140a-n. The battery cells 1120a-n, 1140a-n are connected together in parallel within their respective battery layer 1110a-k. Each battery cell 1120a-n, 1140a-n is connected to its respective protection circuit (e.g., a fuse) 1180a-n, 1170a-n. A virtual cell management (VCM) controller 1190 is connected to the voltage controllers 1130a-k, the battery layers 1110a-k, and the battery pack 1160.

It should be noted that in other embodiments, the system 1100 may employ less than k number of virtual controllers 1130a-k, as is shown in FIG. 11. In particular, the functionality of the k number of virtual controllers 1130a-k may performed by a single virtual controller unit 1130a-k (i.e. for this case, the system 1100 would only have one virtual controller 1130a-k) or performed by fewer than k number of virtual controllers 1130a-k. In addition, it should be noted that in some embodiments, the VCM controller 1190 may be integrated within at least one virtual controller 1130a-k. For these embodiments, the VCM controller 1190 and at least one virtual controller 1130a-k will be integrated together within a single unit, which will be implemented into the system 1100.

The output terminals of each voltage controller 1130a-k are connected to the positive and negative terminals of its corresponding battery layer 1110a-k, while the input terminals of each voltage controller 1130a-k are commonly connected to the positive and negative terminals of the battery pack 1160. In this way, the input voltages of all of the voltage controllers 1130a-k are equal to the battery output voltage, while the output voltages of all of the voltage controllers 1130a-k are controlled to be equal to the (battery output voltage)/k, for the embodiment depicted in FIG. 11.

It should be noted that for various different embodiments, various other devices (e.g., another battery, a direct current (DC) power source, etc.) may be employed by the disclosed system 1100 to connect to the input sides of the voltage controllers 1130a-k. For these embodiments, the statements that the input voltages of all of the voltage controllers 1130a-k are equal to the battery output voltage and the output voltages of all of the voltage controllers 1130a-k are controlled to be equal to the (battery output voltage)/k, will not be true.

The voltage controllers 1130a-k are controlled such that they can source or sink current. Since the input voltage is always positive, this means that the voltage controllers 1130a-k can either draw power from the battery pack 1160 or send power back to the battery pack 1160. It should be noted that in other embodiments, other various devices may be used to connect to the input sides of the voltage controllers 1130a-k. Examples of other various devices that may be employed to source voltage to the battery pack 160 include, but are not limited to, another battery and a direct current (DC) source.

The VCM controller 1190 receives the voltage and current signals (Vn, In, n=1, 2, . . . k) from each corresponding battery layer 1110a-k and the voltage and current signals (V0, I0) from the battery pack 1160. The VCM controller 1190 sends a control signal (Vref) to the voltage controllers 1130a-k. The status of each battery layer 1110a-k is collected by the VCM controller 1190 and sent 1195 to the system controller (not shown) for battery health and life management.

Figure 12:
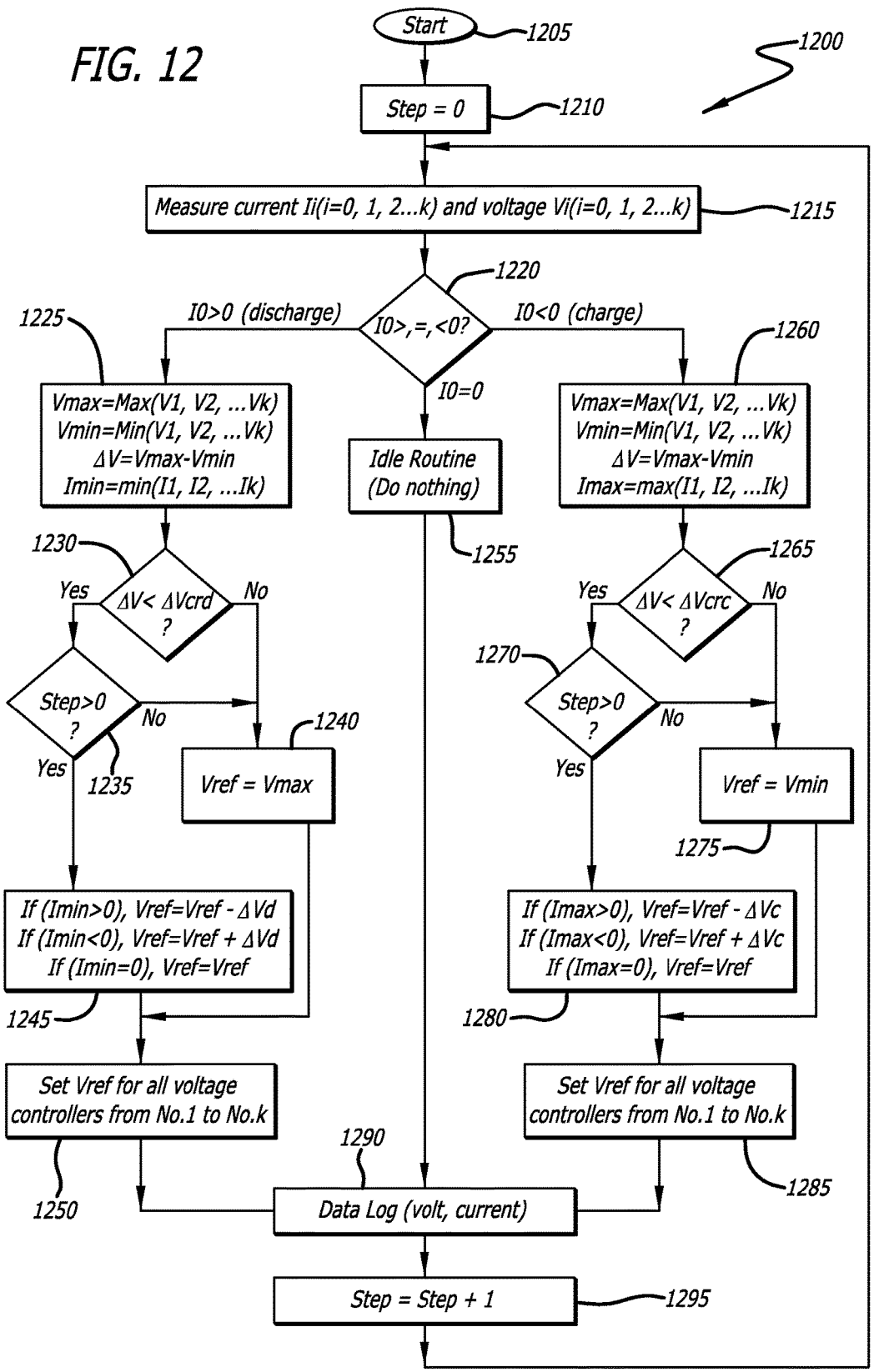
FIG. 12 is a flow chart showing the disclosed method for battery management for the exemplary system of FIG. 11, in accordance with at least one embodiment of the present disclosure.

FIG. 12 is a flow chart 1200 showing the disclosed method for battery management for the exemplary system of FIG. 11, in accordance with at least one embodiment of the present disclosure. At the start 1205 of the method 1200, the step is first initialized to zero (0). Then, the VCM controller 1190 measures the current from the battery pack 1160 and from each battery layer 1110a-k (Ii, where i=0, 1, 2, . . . k) and the voltage from the battery pack 1160 and from each battery layer 1110a-k (Vi, where i=0, 1, 2, . . . k). The VCM controller 1190 then determines whether the battery pack 1160 is discharging, charging, or idle by analyzing the battery pack 1160 current (I0) 1220. If the battery pack 1160 current (I0) is greater than zero (0), the VCM controller 1190 determines that the battery pack 1160 is discharging (i.e. current is flowing out of the battery pack 1160); if the current (I0) is less than zero (0), the VCM controller 1190 determines that the battery pack 1160 is charging (i.e. current is flowing into the battery pack 1160); and if the current (I0) is equal to zero (0), the VCM controller 1190 determines that the battery pack 1160 is idle (i.e. no current is flowing into or out of the battery pack 1160).

If the VCM controller 1190 determines that the battery pack 1160 is discharging, the VCM controller 1190 will determine Vmax, Vmin, $\Delta V$, and Imin 1225. Vmax is equal to the maximum voltage of all of the battery layers 1110a-k, Vmin is equal to the minimum voltage of all of the battery layers 1110a-k, $\Delta V$ is equal to Vmax minus Vmin, and Imin is equal to the minimum current of all of the battery layers 1110a-k. Then, the VCM controller 1190 determines whether $\Delta V$ is less than $\Delta$Vcrd 1230, where $\Delta$Vcrd is equal to the maximum allowable voltage difference among two battery layers 1110a-k during discharge, which is a predefined positive value.

If the VCM controller 1190 determines that $\Delta V$ is less than $\Delta$Vcrd, the VCM controller 1190 will determine whether the step is greater than zero (0) 1235. If the VCM controller 1190 determines that the step is not greater than zero (0), then the VCM controller will set Vref to be equal to Vmax 1240. Also, if the VCM controller 1190 determines that ΔV is not less than ΔVcrd, then the VCM controller will set Vref to be equal to Vmax 1240.

However, if the VCM controller 1190 determines that the step is greater than zero (0): if Imin is greater than zero, the VCM controller 1190 will set Vref equal to Vref minus ΔVd (where ΔVd is equal to a predefined positive value to adjust the voltage during discharge); if Imin is less than zero, the VCM controller 1190 will set Vref equal to Vref plus ΔVd; and if Imin is equal to zero, the VCM controller 1190 will set Vref equal to Vref 1245. Then, the VCM controller 1190 will set Vref for all of the voltage controllers 1130a-k (No. 1 through k) 1250.

If the VCM controller 1190 determines that the battery pack 1160 is charging, the VCM controller 1190 will determine Vmax, Vmin, ΔV, and Imax 1260. Vmax is equal to the maximum voltage of all of the battery layers 1110a-k, Vmin is equal to the minimum voltage of all of the battery layers 1110a-k, ΔV is equal to Vmax minus Vmin, and Imax is equal to the maximum current of all of the battery layers 1110a-k. Then, the VCM controller 1190 determines whether ΔV is less than ΔVcrc 1265, where ΔVcrc is equal to the maximum allowable voltage difference among two battery layers 1110a-k during charge, which is a predefined positive value.

If the VCM controller 1190 determines that ΔV is less than ΔVcrc, the VCM controller 1190 will determine whether the step is greater than zero (0) 1270. If the VCM controller 1190 determines that the step is not greater than zero (0), then the VCM controller will set Vref to be equal to Vmin 1275. Also, if the VCM controller 1190 determines that ΔV is not less than ΔVcrc, then the VCM controller will set Vref to be equal to Vmin 1275.

However, if the VCM controller 1190 determines that the step is greater than zero (0): if Imax is greater than zero, the VCM controller 1190 will set Vref equal to Vref minus ΔVc (where ΔVc is equal to a predefined positive value to adjust the voltage during charge); if Imax is less than zero, the VCM controller 1190 will set Vref equal to Vref plus ΔVc; and if Imax is equal to zero, the VCM controller 1190 will set Vref equal to Vref 1280. Then, the VCM controller 1190 will set Vref for all of the voltage controllers 1130a-k (No. 1 through k) 1285.

After Vref is set for all of the voltage controllers 1130a-k, voltage and/or current data (e.g., the reference voltage (Vref), the voltage of the battery pack (V0), the current of the battery pack (I0), the voltage of at least one battery layer (V1-Vk), and/or the current of at least one battery layer (I1-Ik)) is optionally sent to and logged by a system controller 1290. Then, the step number is increased by one (1) 1295. After the step number is increased by one, the method 1200 repeats starting from step 1215.

Figure 13:
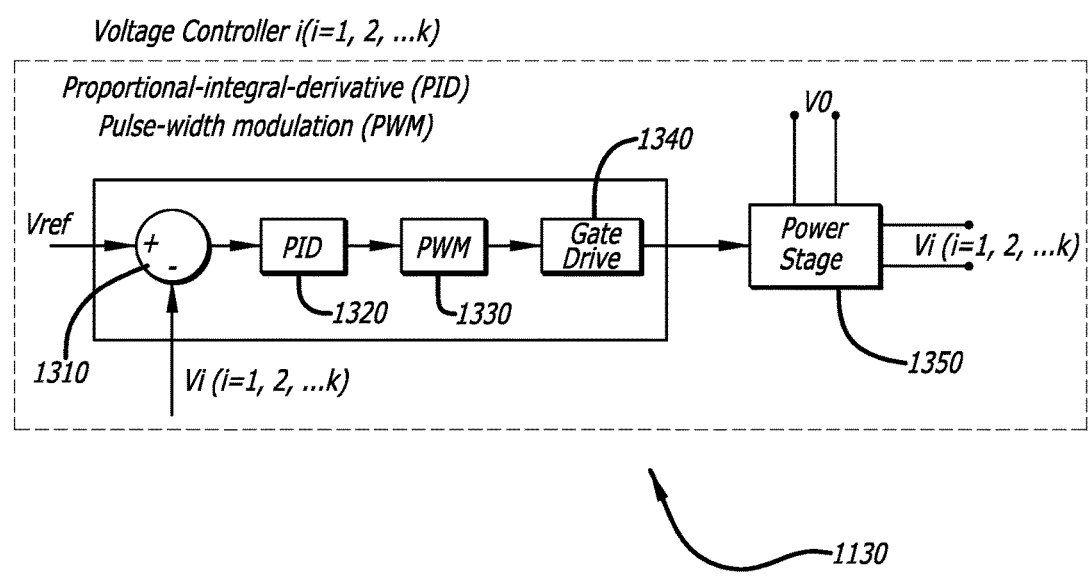
FIG. 13 is a schematic diagram of an exemplary voltage controller employed by the disclosed battery management system of FIG. 11, in accordance with at least one embodiment of the present disclosure.

FIG. 13 is a schematic diagram of an exemplary voltage controller 1130 employed by the disclosed battery management system 1100 of FIG. 11, in accordance with at least one embodiment of the present disclosure. In this figure, Vref and the voltages from the battery layers (Vi, where i=1, 2, ... k) are shown to be input into the voltage controller 1130. Vref and the voltages from the battery layers are then summed 1310 (note that in reality, the summer 1310 performs a minus operation). The resultant signal is then input into a proportional-integral-derivative (PID) controller 1320. The signal outputted from the PID controller 1320 is then input into a pulse-width-modulation (PWM) controller 1330. Then, the signal outputted from the PWM controller 1330 is inputted into a gate drive 1340. The gate drive 1340 then sends voltages to the transistors of a power stage 1350. The power stage 1350 then provides a voltage (V0) to the battery pack 1160 and voltages (Vi, i=1, 2, ... k) to each of the battery layers 1110a-k.

It should be noted that for each of the k number of voltage controllers 1130, only two voltages are required as inputs (i.e. one is the reference voltage (Vref) and the other is the voltage (Vi) corresponding to the battery layer that is associated with the voltage controller 1130). As such, each voltage controller 1130 does not sum 1310 Vref with all the voltages of the battery layers (i.e Vi, where i=1, 2, ... k). But rather the voltage controller 1130 sums 1310 Vref only with the voltage (Vi) for the battery layer that corresponds to the voltage controller 1130. For example, for battery layer 2, Vref and V2 are used as inputs to the voltage controller, and are subsequently summed 1310 together by the voltage controller 1130.

Figure 14:
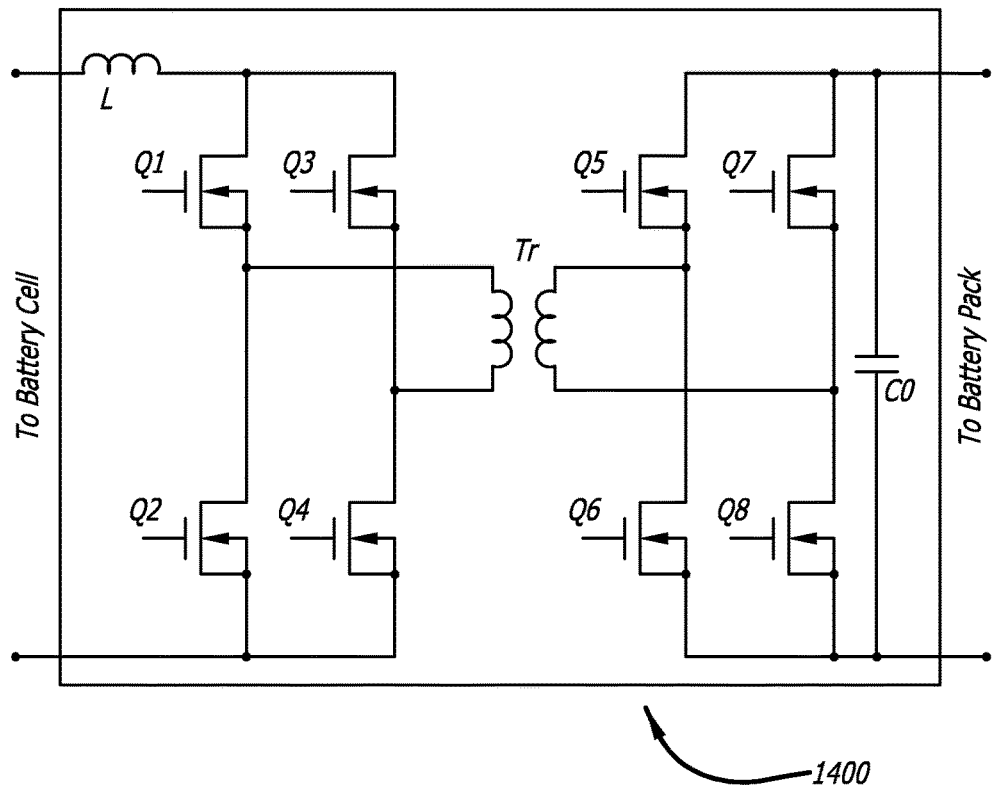
FIG. 14 is a schematic diagram of an exemplary isolated bi-directional full-bridge converter that may be employed by the voltage controller of FIG. 13, in accordance with at least one embodiment of the present disclosure.
Figure 15:
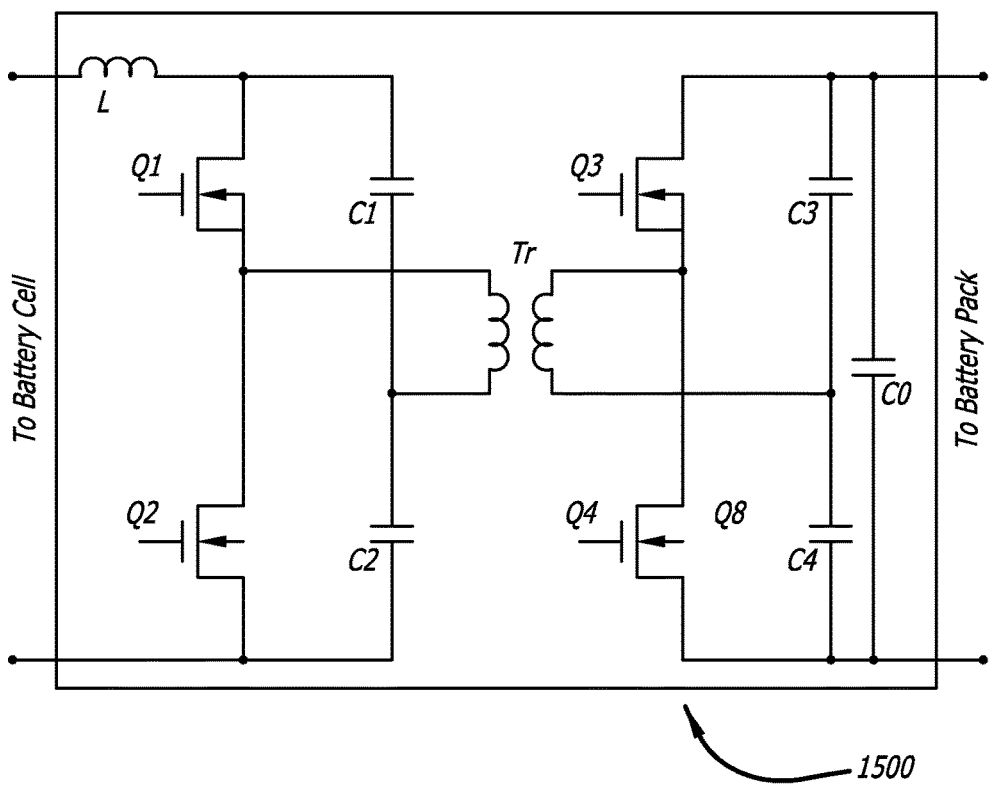
FIG. 15 is a schematic diagram of an exemplary isolated bi-directional half-bridge converter that may be employed by the voltage controller of FIG. 13, in accordance with at least one embodiment of the present disclosure.

FIG. 14 is a schematic diagram of an exemplary isolated bi-directional full-bridge converter 1400 that may be employed by the voltage controller 1130 of FIG. 13, in accordance with at least one embodiment of the present disclosure. And, FIG. 15 is a schematic diagram of an exemplary isolated bi-directional half-bridge converter 1500 that may be employed by the voltage controller 1130 of FIG. 13, in accordance with at least one embodiment of the present disclosure. In particular, the converters 1400, 1500 depicted in FIGS. 14 and 15 may be employed for the power stage 1350 of the voltage controller 1130 of FIG. 13. It should be noted that in other embodiments, other converters than the converters illustrated in FIGS. 14 and 15 may be employed by the disclosed system for the power stage 1350 of the voltage controllers 1130.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for battery management, the method comprising:
   current balancing through at least one of sinking current and sourcing current, by at least one virtual cell, for battery cells in a battery pack based on available current and capacity of the battery cells,
   wherein the battery pack comprises at least one battery layer that comprises at least one of the battery cells, and wherein when there is more than one of the at least one battery cell within the at least one battery layer, the battery cells are connected together in parallel within the at least one battery layer;
   determining, by a virtual cell management controller, when the virtual cell management controller determines that the battery pack is charging, a reference voltage by using a voltage and a current of the at least one battery layer;
   determining, by the virtual cell management controller, when the virtual cell management controller determines that the battery pack is discharging, the reference voltage by using the voltage and the current of the at least one battery layer; and providing, by at least one voltage controller, a respective battery layer voltage to the at least one battery layer associated with the at least one voltage controller, wherein the respective battery layer voltage is dependent upon the reference voltage and the voltage of the at least one battery layer.

2. The method of claim 1, wherein the at least one virtual cell is capable to at least one of sink current and source current for at least one of at least one degraded battery cell and at least one dead battery cell.

3. A method for battery management for current balancing battery cells based on the capability of the battery cells, the method comprising:
- receiving, by a virtual cell management controller, a voltage and a current of at least one battery layer, wherein the at least one battery layer comprises at least one of the battery cells, and wherein when there is more than one of the at least one battery cell within the at least one battery layer, the battery cells are connected together in parallel within the at least one battery layer;
- receiving, by the virtual cell management controller, a voltage and a current of a battery pack, wherein the battery pack comprises all of the battery cells;
- determining, by the virtual cell management controller, whether the battery pack is one of charging, discharging, and idle, by analyzing the current of the battery pack;
- determining, by the virtual cell management controller, when the virtual cell management controller determines that the battery pack charging, a reference voltage by using the voltage and the current of the at least one battery layer;
- determining, by the virtual cell management controller, when the virtual cell management controller determines that the battery pack is discharging, the reference voltage by using the voltage and the current of the at least one battery layer;
- providing, by at least one voltage controller, a battery pack voltage to the battery pack; and
- providing, by the at least one voltage controller, a respective battery layer voltage to the at least one battery layer associated with the at least one voltage controller, wherein the respective battery layer voltage is dependent upon the reference voltage and the voltage of the at least one battery layer.

4. The method of claim 3, wherein the virtual cell management controller is integrated within the at least one voltage controller.

5. The method of claim 3, wherein when there is more than one of the at least one battery layer, the battery layers are connected together in series.

6. The method of claim 3, wherein the method further comprises logging, by a system controller, at least one of the reference voltage, the voltage of the battery pack, the current of the battery pack, the voltage of the at least one battery layer, and the current of the at least one battery layer.

7. The method of claim 3, wherein the at least one voltage controller comprises at least one of a proportional integral derivative (PID) controller, a pulse width modulation (PWM) controller, a gate drive, and a power stage.

8. The method of claim 7, wherein the power stage is a direct current/direct current (DC/DC) converter.

9. The method of claim 8, wherein the DC/DC converter is one of an isolated bi-directional full-bridge converter and an isolated bi-directional half-bridge converter.

10. The method of claim 3, wherein at least one of the at least one battery cell is connected to a fuse.

11. The method of claim 3, wherein the virtual cell management controller determines the reference voltage by using a maximum voltage of the at least one battery layer and a minimum voltage of the at least one battery layer.

12. The method of claim 11, wherein when the battery pack is discharging, the virtual cell management controller determines the reference voltage by further using the minimum current of the at least one battery layer.

13. The method of claim 11, wherein when the battery pack is charging, the virtual cell management controller determines the reference voltage by further using the maximum current of the at least one battery layer.

14. A system for battery management for current balancing battery cells based on the capability of the battery cells, the system comprising:
- at least one battery layer, wherein the at least one battery layer comprises at least one of the battery cells, and wherein when there is more than one of the at least one battery cell within the at least one battery layer, the battery cells are connected together in parallel within the at least one battery layer;
- a battery pack, wherein the battery pack comprises all of the battery cells;
- a virtual cell management controller to receive a voltage and a current of the at the least one battery layer, to receive a voltage and a current of the battery pack, to determine whether the battery pack is one of charging, discharging, and idle by analyzing the current of the battery pack, to determine, when the virtual cell management controller determines that the battery pack is charging, a reference voltage by using the voltage and the current of the at least one battery layer, and to determine, when the virtual cell management controller determines that the battery pack is discharging, the reference voltage by using the voltage and the current of the at least one battery layer; and
- at least one voltage controller to provide a battery pack voltage to the battery pack, and to provide a respective battery layer voltage to the at least one battery layer associated with the at least one voltage controller, wherein the respective battery layer voltage is dependent upon the reference voltage and the voltage of the at least one battery layer.

15. The system of claim 14, wherein the virtual cell management controller is integrated within the at least one voltage controller.

16. The system of claim 14, wherein when there is more than one of the at least one battery layer, the battery layers are connected together in series.

17. The system of claim 14, wherein the system further comprises a system controller to log at least one of the reference voltage, the voltage of the battery pack, the current of the battery pack, the voltage of the at least one battery layer, and the current of the at least one battery layer.

18. The system of claim 14, wherein the at least one voltage controller comprises at least one of a proportional integral derivative (PID) controller, a pulse width modulation (PWM) controller, a gate drive, and a power stage.

19. The system of claim 18, wherein the power stage is a direct current/direct current (DC/DC) converter.

20. The system of claim 19, wherein the DC/DC converter is one of an isolated bi-directional full-bridge converter and an isolated bi-directional half-bridge converter.

21. The system of claim 14, wherein at least one of the at least one battery cell is connected to a fuse.

22. The system of claim 14, wherein the virtual cell management controller determines the reference voltage by using a maximum voltage of the at least one battery layer and a minimum voltage of the at least one battery layer.

23. The system of claim 22, wherein when the battery pack is discharging, the virtual cell management controller determines the reference voltage by further using the minimum current of the at least one battery layer.

24. The system of claim 22, wherein when the battery pack is charging, the virtual cell management controller determines the reference voltage by further using the maximum current of the at least one battery layer.

* * * * *